United States Patent [19]

Moncheaux et al.

[11] Patent Number: 5,176,776
[45] Date of Patent: Jan. 5, 1993

[54] PROCESS FOR PRODUCING AN ASYMMETRICAL LAMINATED GLAZING BY CALENDERING

[75] Inventors: Michel M. Moncheaux, Compiegne; Francis M. Triffaux, Thourotte, both of France

[73] Assignee: Saint-Gobain Vitrage International, Courbevoie, France

[21] Appl. No.: 524,561

[22] Filed: May 17, 1990

[30] Foreign Application Priority Data

May 17, 1989 [FR] France .................. 89 06389

[51] Int. Cl.⁵ .............................................. B32B 31/20
[52] U.S. Cl. ............................... 156/238; 156/256
[58] Field of Search ............... 156/99, 361, 230, 231, 156/238, 541, 265, 267, 102, 104, 106, 542, 582, 256

[56] References Cited

U.S. PATENT DOCUMENTS

| | | | |
|---|---|---|---|
| 1,779,425 | 10/1930 | Feybusch | 156/542 X |
| 3,837,952 | 9/1974 | Mogford | 156/99 |
| 4,174,076 | 11/1979 | Tolliver | 242/56 B |
| 4,190,472 | 2/1980 | Slonicki | 156/542 X |
| 4,327,634 | 5/1982 | Colmon et al. | 156/582 X |
| 4,399,178 | 8/1983 | Barta | 156/230 X |
| 4,475,969 | 10/1984 | Reed | 156/265 X |
| 4,502,910 | 3/1985 | Volmer et al. | 156/361 |
| 4,617,080 | 10/1986 | Kobayashi et al. | 156/542 X |
| 4,728,386 | 3/1988 | Horvath | 156/99 X |
| 4,956,034 | 9/1990 | Shinozaki et al. | 156/102 |

FOREIGN PATENT DOCUMENTS 0137522 4/1985 European Pat. Off. .

Primary Examiner—Michael W. Ball
Assistant Examiner—Francis J. Lorin
Attorney, Agent, or Firm—Oblon, Spivak, McClelland, Maier & Neustadt

[57] ABSTRACT

A process is provided for assembling asymmetrical glazings made from a rigid support and a flexible sheet blank, using a continuous ribbon, which greatly reduces losses of flexible sheet material. The assembly device utilizes a continuous ribbon made of a flexible support film, of paper, or of an inexpensive plastic, on which blanks that are prepared or cut previously to the desired geometric shape have been placed, these blanks being placed regularly and separately from one another. The rigid supports and continuous ribbon are advanced to a pressing means to form the glazings.

5 Claims, 1 Drawing Sheet

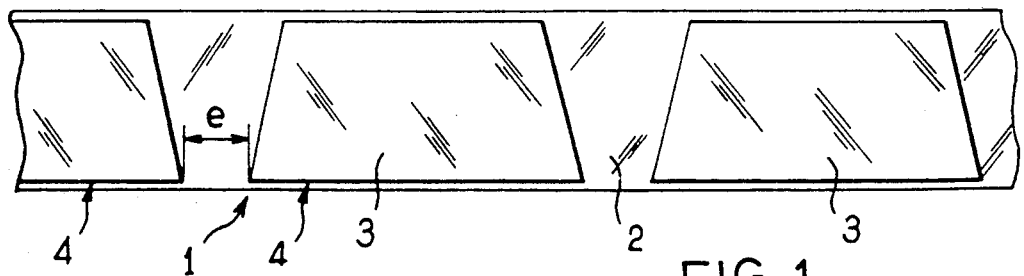
FIG_1
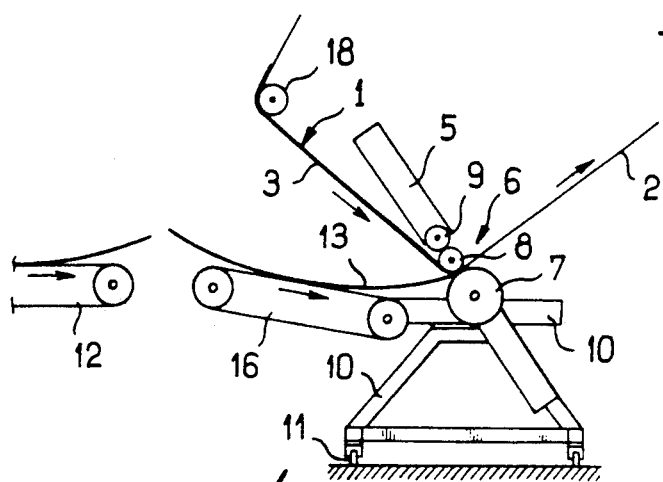
FIG_2
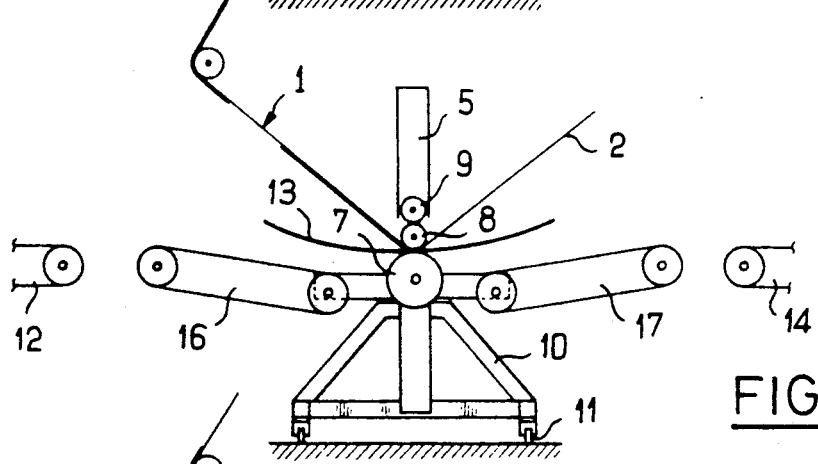
FIG_3
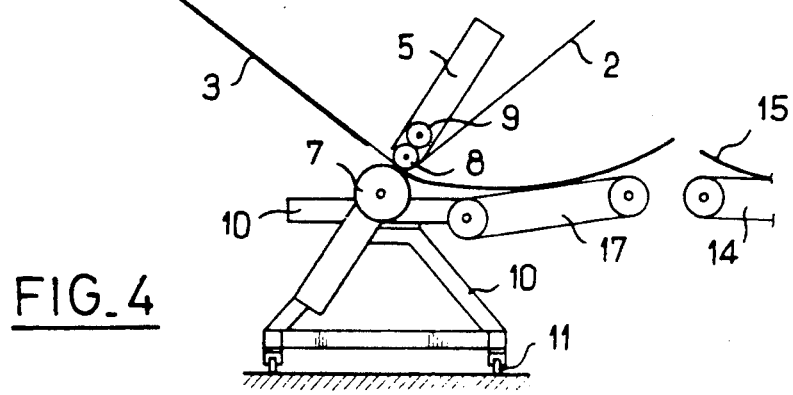
FIG_4

PROCESS FOR PRODUCING AN ASYMMETRICAL LAMINATED GLAZING BY CALENDERING

BACKGROUND OF THE INVENTION

1. Field of the Invention

The invention relates to the production of asymmetrical laminated glazings made of a monolithic or laminated rigid support and a flexible plastic sheet having the desired properties. More particularly, the invention relates to the assembly of the flexible plastic sheet with the rigid support, as well as a prefabricated continuous ribbon comprising the flexible plastic sheet, used for the assembly.

The assembly of the rigid support with the flexible sheet to constitute the laminated glazing is generally performed by a preliminary pressing of the support with the sheet by calendering, followed by an autoclave cycle bringing into play the temperature and pressure which improves adhesion between the constituent elements and thus assures a final assembly.

2. Discussion of the Background

In European publication 0 015 209 a device has already been proposed comprising lower pressing means, particularly a series of rollers placed beside one another, upper pressing means comprising a flexible cylindrical pressing roller, extending over a length at least equal to the width of the elements to be assembled, this flexible roller being held in the desired curvature by upper means pressing on it, all of the pressing elements being mounted on a pivoting frame.

The flexible sheet which is assembled with the rigid support by using this device must be presented in the form of a continuous ribbon to be able to be held in the desired position for the assembly which is performed while advancing.

Unfortunately, in this type of assembly while advancing, it is not possible to present the rigid supports to be coated one after another without separation intervals, especially when it involves glazings curved in the direction of advance which corresponds generally to the curvature in the direction of the length of the glazing. In this case, the assembly operation uses the rocking of the frame pivoting as the glazing advances between the pressing elements, to assure a pressing that is approximately perpendicular to the surface of the glazing during the entire operation.

The position of the frame pivoting at the output of a glazing is generally symmetrical in relation to a plane vertical to the position of the rocking frame at the input of a glazing, so that between the output of one glazing and the input of the next glazing, the frame must rock in the other direction to come back to its start of assembly position.

It is therefore necessary to separate two consecutive rigid supports by an interval at least equal to the distance which corresponds to the advance of the glazings during the return rocking time of the frame. This interval therefore corresponds also to a loss of flexible sheet material.

Further, in the case of automobile glazings, the developed surface of the glazing exhibits an approximately trapezoidal shape which causes other losses of flexible sheet, in particular the entire portion between the contours of the trapezoid that is called a blank and the rectangle in which the blank is inscribed.

The various losses of material can, in total, constitute about 30% of the surface of the sheet.

SUMMARY OF THE INVENTION

Accordingly, an object of the invention is to provide for a novel process for the assembly of asymmetrical glazings made of a rigid support and a flexible sheet, from a continuous ribbon, which greatly reduces the losses of flexible sheet material.

According to the process of the invention, there is presented at the assembly device a continuous ribbon made of a flexible support film, of paper, or of an inexpensive plastic, on which blanks that are prepared or cut previously to the desired geometric shape have been placed, these blanks being placed regularly and separately from one another. Generally, the separation distance between two blanks is at least equal to that corresponding to the advance of the film during the time taken by the assembly device to go from the output position of one glazing to the input position of the next glazing.

The time taken by the device to change position corresponds to the return rocking time when the device is equipped with a rocking frame.

Of course, the blanks must adhere sufficiently to the support film so that the unit can be wound or unwound, but not too much, so that they can be separated from the support film for assembly.

The invention also relates to the prefabricated flexible ribbon comprising the support film and the blanks regularly placed on it.

To make up this flexible prefabricated ribbon, several variants are possible according to the invention.

In a first embodiment, the plastic sheet can be produced to size by using as formation support a continuous bed made of trapezoids placed head to tail. When the plastic sheet is removed from the formation support, the trapezoidal blanks are directly obtained. They are then placed regularly and with the same orientation on the support film to form the prefabricated ribbon which will be used for later assembly by calendering.

In a variant, the flexible sheet is produced by using a continuous formation sheet, of glass or metal, as described for example in the publications of French Patents 2,230,487 or 2,549,414, or on a taut flexible support as described for example in the publication of French Patent 2,480,669. The continuous plastic sheet thus produced is cut into blanks after having been removed from the formation support or cut with the support itself when it is a taut flexible support and when it is part of the fabricated sheet which is then a composite sheet.

The blanks obtained are then placed as before in a regular manner and in the same orientation on the support film to constitute the prefabricated ribbon which will be used for the assembly.

Accordingly, the present invention relates to a process for the assembly, by calendering, of an asymmetrical glazing made of a rigid support and a flexible plastic sheet, the process comprising the steps of: positioning blanks in a spaced manner at regular intervals on a continuous support film to form the flexible plastic sheet; and forming the flexible plastic sheet into a continuous ribbon, wherein the sheet which is to be assembled to the support is brought for assembly in the form of the continuous ribbon.

The present invention also relates to a prefabricated flexible ribbon for the assembly of asymmetrical glazings comprising: a support film; and plastic blanks, wherein the plastic blanks have a high optical quality and are positioned in a spaced manner at regular intervals on the support film.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 diagrammatically represents the prefabricated continuous ribbon used according to the invention for the assembly by calendering; and FIGS. 2, 3 and 4 diagrammatically represent the principle of the calendering according to the invention with use of a prefabricated continuous ribbon as shown in FIG. 1.

DESCRIPTION OF THE PREFERRED EMBODIMENTS

FIG. 1 represents a prefabricated continuous ribbon 1 made of a support film 2, for example of paper or inexpensive plastic, and blanks 3 of high quality optical plastic intended to cover monolithic or laminated supports to form laminated safety glazings.

These blanks are presented in trapezoid form and they are placed regularly one after another while being spaced a sufficient distance to make possible the assembly by calendering of bent glazings in a successive manner. Thus, distance e between two large bases 4 of two consecutive trapezoids is about 15 cm in the case of a motor vehicle windshield, for example.

To form continuous ribbon 1, plastic blanks 3 are previously produced generally in a continuous process. The plastic sheets are, for example, sheets with one or more layers of polyurethane, such as the ones described for example in the publications of French Patent 2,351,917 or European Patent EP 0,133,090.

When they are associated with a monolithic support of glass, these sheets generally comprise two layers of polyurethane: one layer having energy absorbing properties and one layer having surface properties, particularly resistance to scoring and to abrasion. These polyurethane-based sheets are generally obtained by casting on a plane support passing continuously under the device for supplying the material able to form the layer or layers. The plastic sheet obtained is removed from the formation support either directly in the form of trapezoidal blanks when the formation support itself consists of trapezoids placed head to tail to form a continuous bed, or in the form of a continuous sheet which can be wound and stored, then cut into blanks, or cut directly into blanks.

The blanks obtained are then placed on support film 2, in a regular manner, as previously described. A prefabricated ribbon 1 is obtained which can be used in a calendering line for the production of safety glazings. In FIG. 1, a support film has been shown whose width is preferably slightly larger than the height of the blanks. The blanks can thus be perfectly supported by the film and protected by it in a winding. The support film is slightly adherent to be able to assure the hold of the blanks regardless of the position of the prefabricated ribbon.

In FIGS. 2, 3 and 4, an assembly by calendering has been shown using the prefabricated ribbon according to the invention. The assembly device used is, for example, the one described in the European Patent 0,015,209 already cited. This device comprises a frame 5 pivoting around a horizontal pin placed crosswise in relation to the assembly line. This pivoting frame carries pressing means 6 made of lower pressing means, for example a series of rollers 7, upper pressing means comprising a flexible cylindrical pressing roller 8 and a series of upper rollers 9 pressing on it to give it the desired curvature which, here, is the crosswise curvature of the glazings to be assembled. The mobile frame is mounted on a frame 10, which can be, if necessary, displaced crosswise, by being placed on small wheels 11.

The calendering device is placed between an upstream conveyor 12 with rollers or belts which brings support 13 to be covered, generally a bent glass sheet, and a downstream conveyor 14 which receives and separates the covered supports constituting laminated glazings 15. End portion 16 of the upstream conveyor and end portion 17 of the downstream conveyor are inclined in relation to the horizontal so as to bring or receive the edge of supports 13 perpendicular to the pressing plane without it being necessary to incline greatly the pivoting frame.

Prefabricated ribbon 1 described previously is brought over the device in the direction indicated by the arrows, while being kept taut by an upper tension roller 18.

When the support to be covered arrives on inclined upstream conveyor 16 in the direction indicated by the arrows, mobile frame 5 is made to pivot to incline the upper portion of the frame upstream so that the raised edge of support 13 to be covered can be presented perpendicular to the pressing plane.

Of course, the approach of support 13 to be covered is synchronized with the approach of blank 3 which will be used in the assembly operation with support 13 to make up glazing 15, the speeds of advance of the support and of the blank being identical.

Support 13 is carried by lower rollers 7 and blank 3 by pressing roller 8 which presses it at all points on support 13. At the same time that it is assembled with the support to be covered, blank 3 is separated from support film 2 which is held taut and which is pulled by an accompanying device not shown.

Frame 5 pivots to reach the vertical position corresponding to half the assembly operation, then its upper part is inclined toward downstream conveyor 17 for the last part of the assembly operation. Prefabricated glazing 15 is received by the downstream conveyor.

When a glazing comes out of the device, mobile frame 5 rocks back to regain the position of the start of assembly for the next glazing.

Between the moment when the preceding glazing has exited the pressing and the moment when the next one enters into the pressing axis, prefabricated ribbon 1 has continued its advance over a distance corresponding to the separation between the two consecutive blanks, and the assembly operation is begun again for a new glazing. At the output of the assembly operation, the adhesion between the blank and the rigid support of the glazing can be improved by an autoclave cycle. When the final assembly is achieved, the blank is cut off at the appropriate contours of the glazing.

Obviously, numerous modifications and variations of the present invention ar possible in light of the above teachings. It is therefore to be understood that within the scope of the appended claims, the invention may be practiced otherwise than as specifically described herein.

What is claimed as new and desired to be secured by Letters Patent of the United States is:

1. A process for the assembly, by calendering, of an asymmetrical glazing made of a rigid support and a flexible plastic sheet, said process comprising the steps of:

positioning substantially trapezoidal shaped flexible plastic sheet blanks along a longitudinal direction of a continuous flexible support film in a spaced manner at regular intervals on said continuous flexible support film;

conveying said rigid support of said asymmetrical glazing toward a pressing means;

leading said continuous flexible support film with said flexible plastic sheet blanks positioned thereon to a position between said pressing means and said rigid support of said asymmetrical glazing;

pressing said continuous flexible support film with said flexible plastic sheet blanks positioned thereon against said rigid support through said pressing means so as to cover said rigid support with said flexible plastic sheet blanks; and separating during said pressing step, said continuous flexible support film from said flexible plastic sheet blanks.

2. Process according to claim 1, further comprising the step of:

advancing said continuous flexible support film with said flexible plastic sheet blanks positioned thereon over a distance corresponding to a separation distance between two consecutive flexible plastic sheet blanks between a time period when one glazing exits said pressing step and a next glazing enters said pressing step.

3. Process according to claim 1, further comprising the step of:

synchronizing the advancement of said rigid support toward said pressing means with the approach of a flexible plastic sheet blank positioned on said continuous flexible support film toward said pressing means.

4. Process according to claim 1, comprising the further step of:

cutting said blanks from a continuous sheet.

5. Process according to claim 1, comprising the further step of:

directly forming said blanks on trapezoidal supports to form a continuous bed.

* * * * *